(12) United States Patent
Erno et al.

(10) Patent No.: US 7,802,432 B2
(45) Date of Patent: Sep. 28, 2010

(54) MULTIPLE VANE VARIABLE GEOMETRY NOZZLE

(75) Inventors: Daniel Jason Erno, Clifton Park, NY (US); Philip Paul Beauchamp, Rexford, NY (US); Shashishekara Sitharamarao Talya, Houston, TX (US)

(73) Assignee: General Electric Company, Niskayuna, NY (US)

( * ) Notice: Subject to any disclaimer, the term of this patent is extended or adjusted under 35 U.S.C. 154(b) by 1076 days.

(21) Appl. No.: 11/506,242

(22) Filed: Aug. 18, 2006

(65) Prior Publication Data

US 2008/0041061 A1    Feb. 21, 2008

(51) Int. Cl.
*F02K 1/00* (2006.01)
(52) U.S. Cl. ........................................ 60/771; 239/455
(58) Field of Classification Search .................... 60/770, 60/771, 226.1; 239/265.33, 265.37, 265.39, 239/509, 590.5, 289, 602, 451, 455, 546
See application file for complete search history.

(56) References Cited

U.S. PATENT DOCUMENTS

| 2,724,238 | A |   | 11/1955 | Gregg |
| 2,934,892 | A |   | 5/1960 | Hurlbert et al. |
| 3,226,768 | A | * | 1/1966 | Zelewsky et al. ........... 425/566 |
| 3,391,869 | A |   | 7/1968 | Glass |
| 3,622,076 | A |   | 11/1971 | Streeter |
| 4,163,726 | A |   | 8/1979 | Hughart et al. |
| 4,190,085 | A |   | 2/1980 | Hasa et al. |
| 4,232,595 | A | * | 11/1980 | Cox ............................. 454/29 |
| 5,782,432 | A | * | 7/1998 | Renshaw ................... 244/53 R |
| 6,070,830 | A | * | 6/2000 | Mueller et al. ............ 244/73 R |

FOREIGN PATENT DOCUMENTS

| DE | 283582 | 4/1915 |
| DE | 1937679 | 2/1971 |
| FR | 1198723 | 12/1959 |
| GB | 908042 | 10/2008 |
| WO | 96/41940 | 12/1996 |

* cited by examiner

*Primary Examiner*—Michael Cuff
*Assistant Examiner*—Phutthiwat Wongwian
(74) *Attorney, Agent, or Firm*—Ann M. Agosti

(57) ABSTRACT

Nozzles having variable geometry are disclosed that are comprised of a plurality of vanes that contact one another and can slide with respect to one another. A control element forces the vanes to slide, with contacting sides of the vanes defining an inner flow path through which a fluid may pass. The vanes may be self-similar or different from one another to define the desired geometries of the opening in the nozzles. The vanes may be configured to provide convergent, divergent and convergent-divergent nozzles for a range of applications.

18 Claims, 11 Drawing Sheets

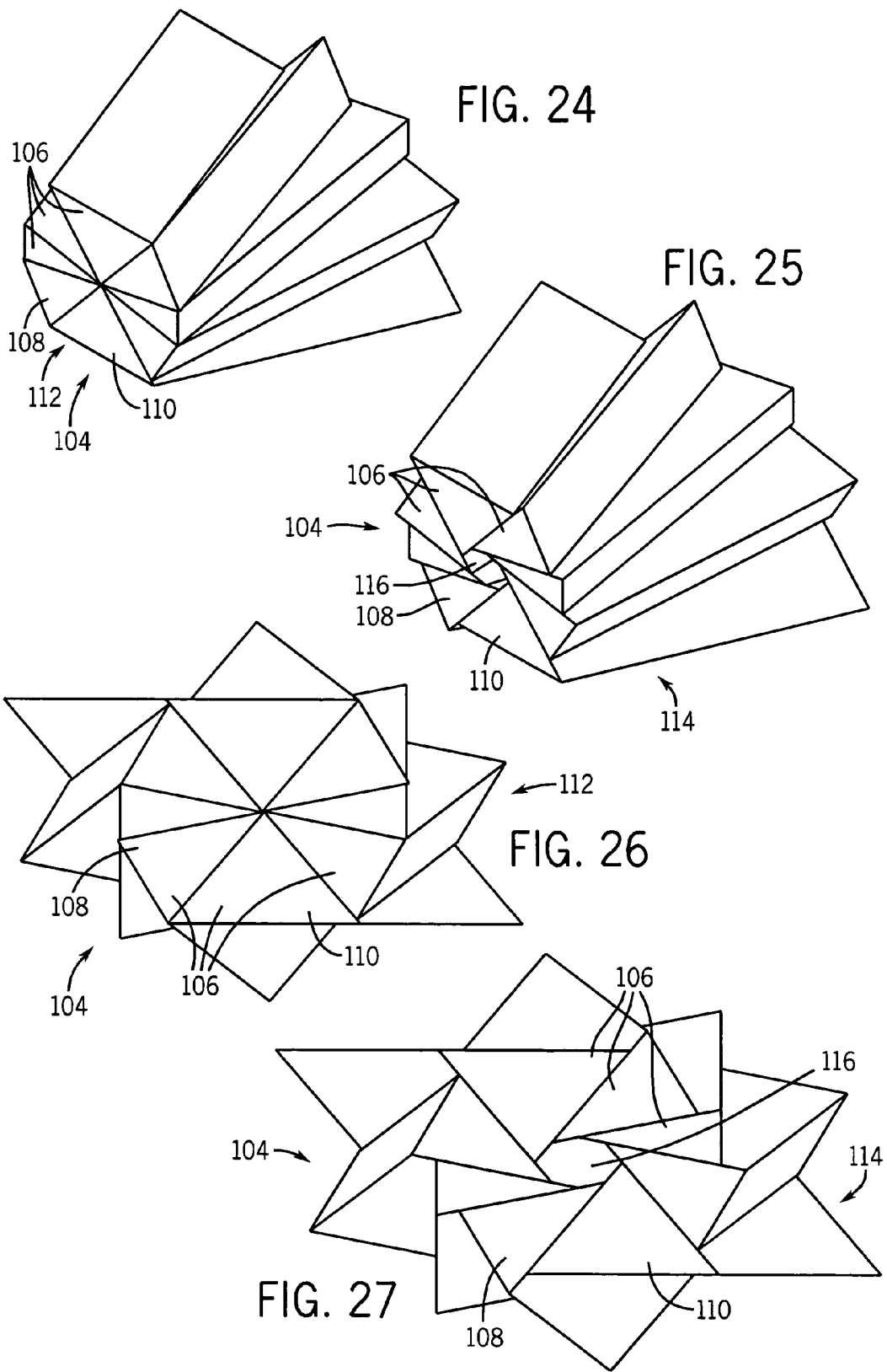

US 7,802,432 B2

MULTIPLE VANE VARIABLE GEOMETRY NOZZLE

BACKGROUND

The present invention relates generally to nozzles, and more particularly to a novel design for a variable-geometry nozzle.

Nozzles are found in a wide range of applications throughout industry, as well as in various vehicles, power generation applications, and so forth. In many applications, fixed-geometry nozzles suffice for changing the velocity and/or direction of flow of a fluid. However, many applications do or could benefit from variable-geometry nozzles to alter fluid flow characteristics during different stages of operation. Even in applications that are not generally considered to include nozzles, many fluid valves effectively regulate, or even interrupt flow in ways that could be likened to nozzle operation. In many such applications, particularly in valves and regulators, flow metering structures could be configured as nozzles if appropriate variable-geometry nozzle designs were available.

By way of example, in hydroelectric power generation facilities, flow control components regulate flow to turbines. These components generally include injectors that receive pressurized water and deliver the water under conditions of high pressure and flow to turbine blades. The injectors themselves are generally configured as large nozzles or valves that can turn on and off water flow, and also regulate the flow of water depending upon output power needs. Such injectors could benefit from variable-geometry nozzles that could supplement or even replace complex valving and flow regulating structures, if such nozzles were available.

Similarly, in gas and steam turbine applications high velocity flows of expanding gasses are commonly directed through various stages of turbines to drive the turbines in rotation. These applications, also, could benefit from variable-geometry nozzles capable of regulating flow, directing flow, and controlling acceleration or other key properties of flowing fluids. The same is true for applications such as jet or rocket engines, which often employ flow control devices, many in the form of fixed-geometry nozzles for the control of thrust and other power characteristics.

There is continuing need, therefore, for improved nozzle designs that can be adapted or applied to such wide ranges of applications.

BRIEF DESCRIPTION

The present invention provides novel variable-geometry nozzles designed to respond to such needs and to serve such applications. In general, the nozzle is made of a series of leaves or vanes that contact one another and can move in sliding motion with respect to one another to vary the geometry of the nozzle. The vanes are typically constrained at either their front end or their rear end, or both, and may be driven in their motion by control devices such as control rings, sliding contact abutment members, and so forth. The vanes can be made in a wide range of configurations depending upon the desired geometries of the nozzle. For example, simple convergent nozzles may be configured, but much more complex convergent-divergent, divergent, and even non-symmetrical arrangements may be envisaged by appropriately configuring the vanes.

In accordance with one aspect of the present invention, then, a nozzle is provided that has a variable geometry. The nozzle includes a plurality of vanes disposed adjacent to and in contact with one another. Each vane has first and second contact sides. The first contact side of each vane is in sliding contact with the second contact side of an adjacent vane. The vanes are skewed from a front side of the nozzle towards a rear side thereof. Moreover, the vanes are movable in sliding contact on one another for altering the geometry of a flow path through the nozzle.

In accordance with another aspect of the invention, a nozzle of the type set forth above is provided, along with a control device. The control device serves to force or urge displacement of the vanes to alter the geometry of the nozzle or the flow path therethrough.

DRAWINGS

These and other features, aspects, and advantages of the present invention will become better understood when the following detailed description is read with reference to the accompanying drawings in which like characters represent like parts throughout the drawings, wherein.

FIGS. 24-27 are perspective and front elevational views of an exemplary non-radially symmetrical nozzle that may be configured by altering the geometry of the individual vanes in accordance with aspects of the invention; and FIGS. 28-32 are perspective and elevational views of a further exemplary configuration in which a particular orifice geometry may be obtained by again configuring individual vanes of the nozzle assembly appropriately in their cross-sectional profile.

DETAILED DESCRIPTION

Figure 1:
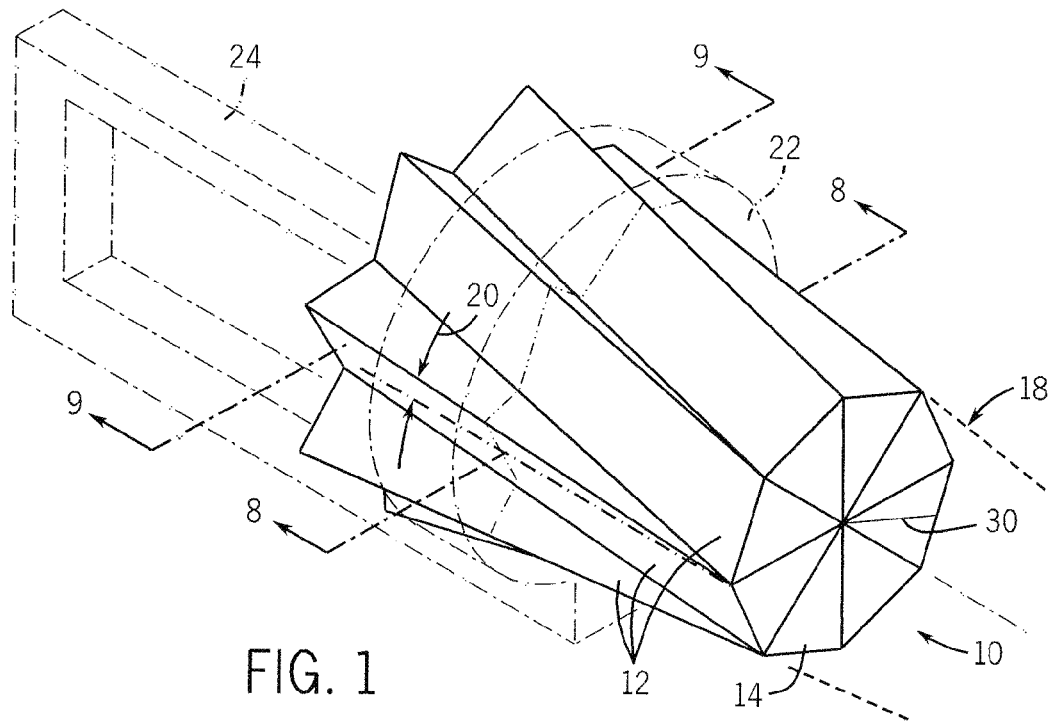
FIGS. 1 and 2 are front and rear perspective views of an exemplary variable-geometry conical nozzle in accordance with aspects of the invention shown in a closed configuration.
Figure 2:
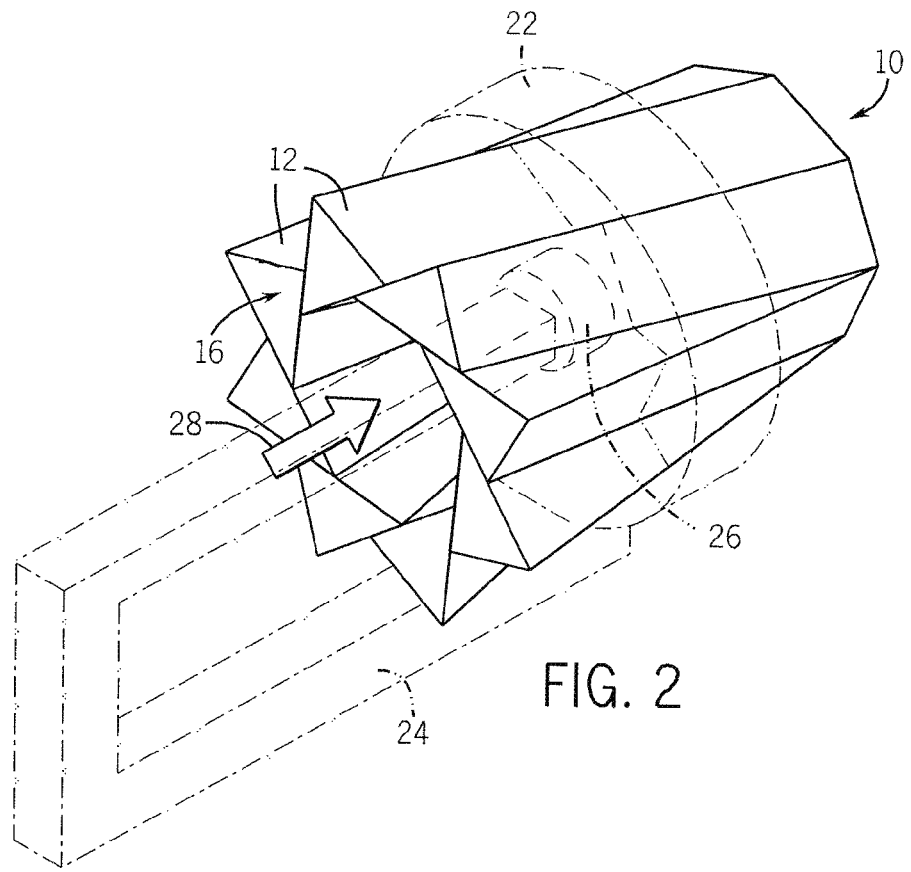

Turning now to the drawings, and referring first to FIGS. 1 and 2, an exemplary nozzle is shown in accordance with certain aspects of the invention. The nozzle, generally indicated by the reference numeral 10, is made up of a plurality of leaves or vanes 12 that are inclined and skewed along their length in an assembly as described in greater detail below. In general, the vanes are, in the embodiment illustrated, elongated solid elements having a uniform cross-section along their length. The vanes are assembled into the form of a nozzle by stacking side-by-side. In the convergent nozzle shown in FIGS. 1 and 2, the vanes are inclined towards a front face 14 from a larger rear face 16. Owing to the configuration and the arrangement of these vanes, the nozzle may be opened and closed as described below. In general, the arrangement of the nozzles of the present invention may make use of an angle of incline, denoted by reference numeral 18 in FIG. 1, as well as an angle of skew indicated by reference numeral 20. In certain vane and assembly designs, the angle of incline may be eliminated. However, in all the present configurations envisaged, a skew angle 20 is provided between the vanes to allow the vanes to be slid with respect to one another during opening and closing, while ensuring desired geometries along the length of the nozzle. As will be appreciated by those skilled in the art, the skew between the vanes may be best understood as a non-parallel wrapping of the vanes with respect to a centerline of the nozzle extending through the nozzle flow path.

In the illustration of FIGS. 1 and 2, the opening and closing of the vanes by sliding action is regulated by an outer control ring 22 which is coupled via one or more links 24 to an inner control ring 26. In the simplified embodiment illustrated in these figures, the outer control ring contacts the outer periphery of the assembly of vanes to control the outward expansion of the vanes, while the inner control ring contacts the inner periphery of the vanes to control their movement toward the inner volume of the nozzle. In practice, the nozzle may be further constrained by a plate, annular valve ring, or similar structure (not shown) adjacent to the front face 14, the rear face 16, or both. Thus, the control rings 22 and 26 may be slid together to the right and the left in the arrangement shown to cause sliding motion of the vanes with respect to one another to open and close the nozzle. The interior volume enclosed by the vanes, then, forms a flow path, indicated generally by reference numeral 28 in FIG. 2, through which fluid may flow. In the closed configuration shown in FIGS. 1 and 2, the vanes meet at the front face 14 to form a closed aperture 30 that generally takes the form of a shutter-like configuration.

Figure 3:
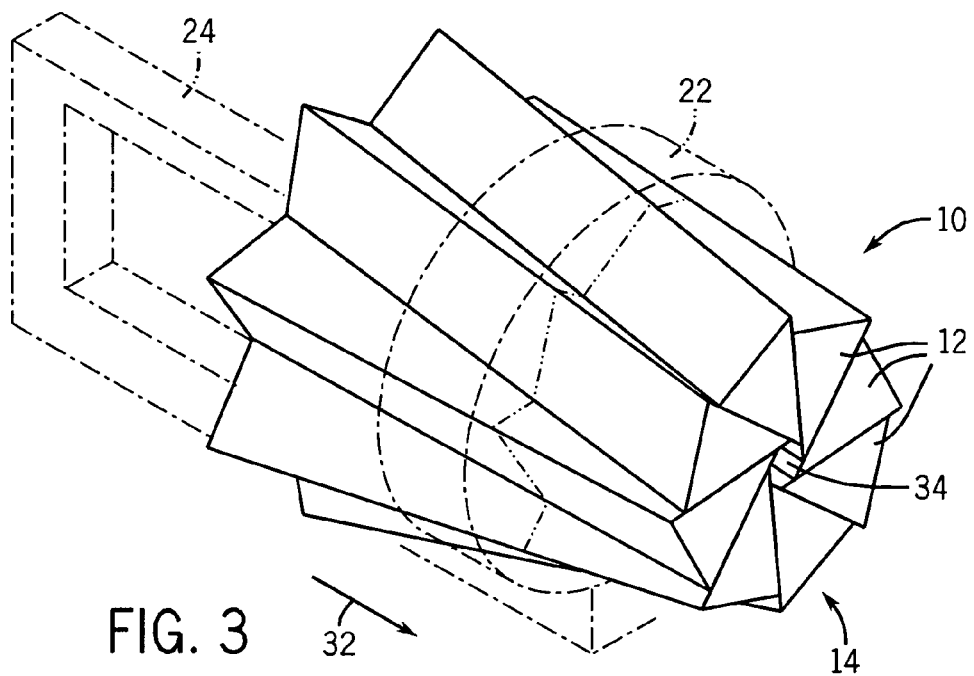
FIGS. 3 and 4 are front and rear perspective views of the same nozzle shown in a partially open configuration.
Figure 4:
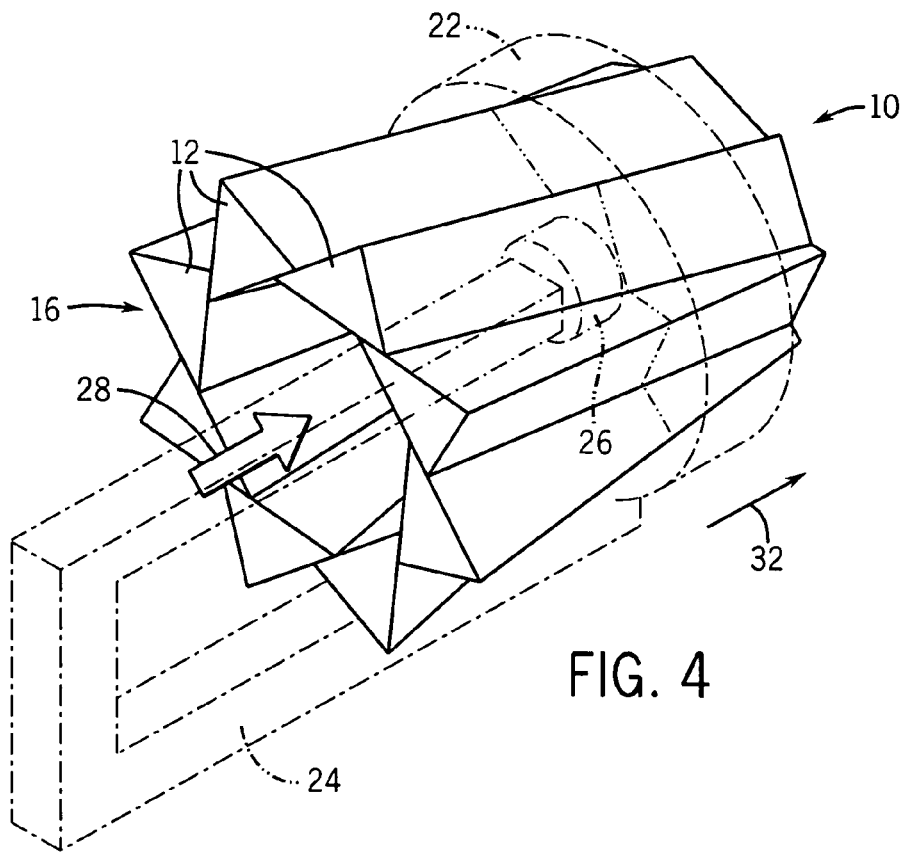
Figure 5:
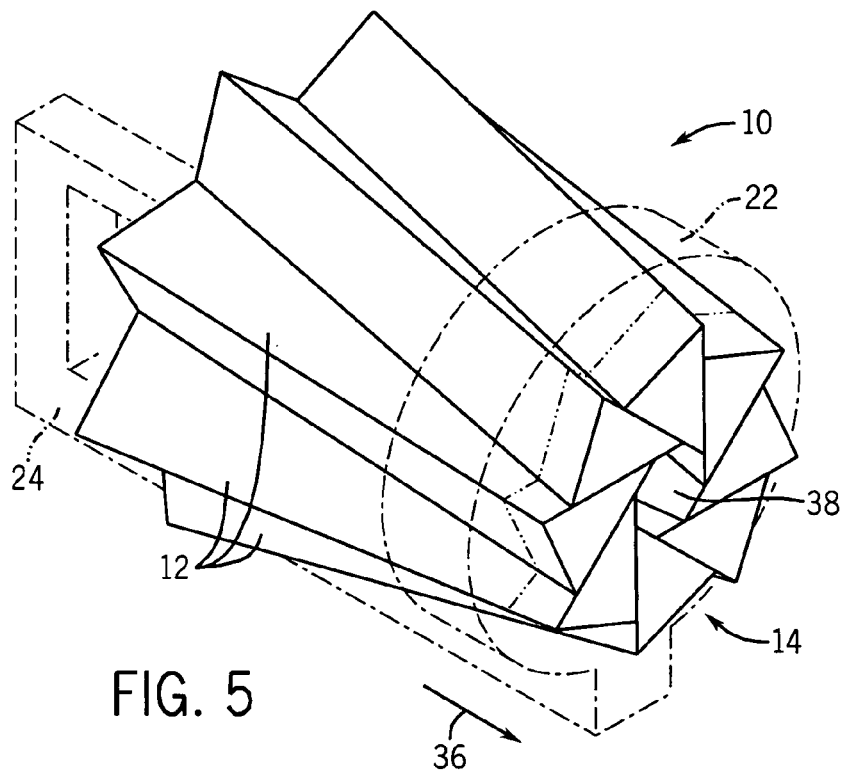
FIGS. 5 and 6 are front and rear perspective views of the same nozzle shown in a fully open configuration.
Figure 6:
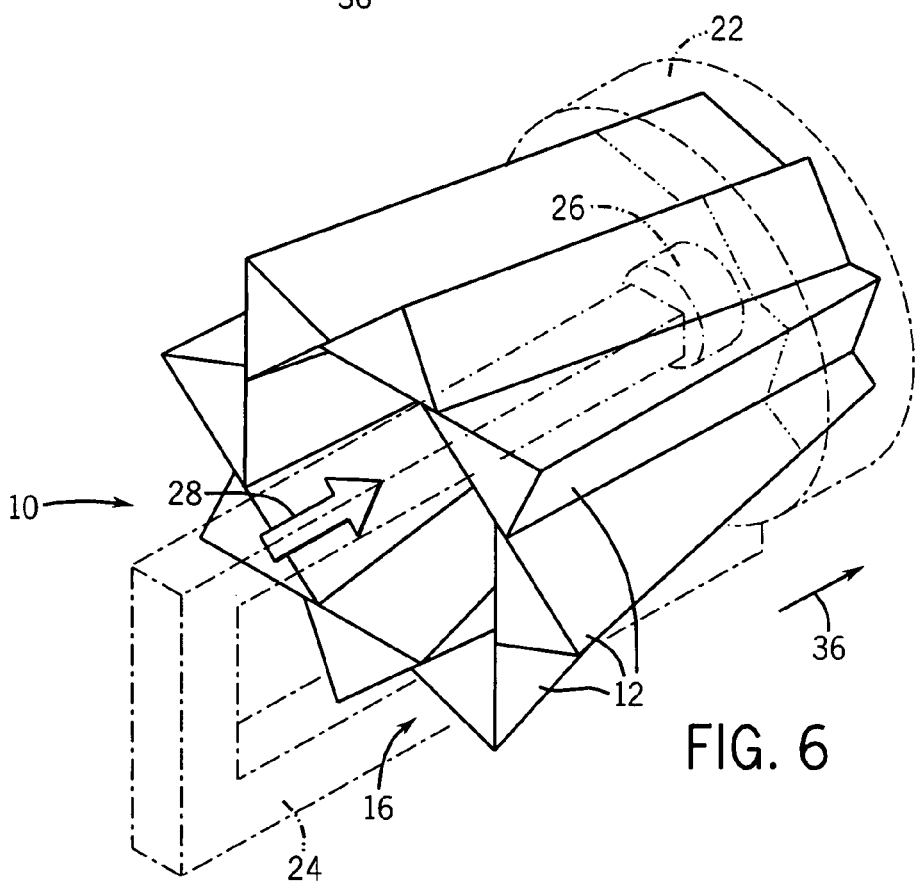

The same arrangement of FIGS. 1 and 2 is further illustrated in FIGS. 3 and 4. In these figures, however, the control assembly, including the outer ring 22 and the inner ring 26 is slid forward toward the middle of the vanes as indicated by arrow 32. It may be noted that the direction of movement of the actuating (i.e., opening and closing) structures in the presently contemplated embodiments is generally parallel to the centerline of the nozzle. In the embodiment illustrated, these structures move along the axis, pushing or pulling the vanes in sliding motion as described below. This movement causes the vanes to slide with respect to one another, expanding the nozzle and forming an opening 34 in the front face 14 thereof. It should be noted that this also opens the flow path through the nozzle by expanding the volume confined within the vanes. FIGS. 5 and 6 illustrate the same arrangement in a fully open configuration. In particular, in FIGS. 5 and 6 the outer control ring 22 and the inner control ring 26 had been slid even further forward to force further outward expansion of the nozzle by sliding of the vanes with respect to one another, as indicated generally by arrow 36. In this position, the nozzle has a fully opened aperture 38 in the front face 14 thereof, with an even larger volume enclosed by the vanes.

It should be noted that in practical applications, the nozzle of the type illustrated in FIGS. 1-6 would likely be confined within a mechanical space or structure, such as a casting, housing, or the like. Such housing may provide for the front and rear confinement surfaces that would contact the front and rear surfaces 14 and 16 as mentioned above. The housing would allow for movement of control elements, such as outer ring 22 and inner ring 26. Those skilled in the art will also note that, while rings and links are shown in FIGS. 1-6 for the sake of simplicity, such control elements may be configured in various ways. For example, full rings having inner and outer surfaces conforming to the geometry of the vanes may be provided as illustrated in the figures, and several such rings may be used in a practical application. In other settings, however, only outer rings, such as conformed to "dove tail" with conforming services of the vanes may be provided and these rings alone slid for opening and closing of the nozzle. Similarly, appropriately conforming inner rings alone may be employed. Where appropriate, the control structures, such as the rings illustrated in FIGS. 1-6 may be replaced with individual control rods or linkages that can force the appropriate sliding motion of the skewed vanes with respect with one another for similarly opening and closing the nozzle. It should also be noted that while the illustrated embodiment provides for fully closing the nozzle, certain nozzle designs may not require such full closure. For example, convergent, divergent, convergent-divergent, and other nozzle configurations may allow for some flow path even in the most closed position of the vanes with respect with one other.

The materials of construction of the nozzle in its various forms in accordance with the present invention may vary widely. Prototypes of the nozzle have been constructed, for example of plastic materials that may be suitable in many fluid applications. However, high temperature, high pressure, or high volume applications may require metallic structures, including more exotic compositions and alloys, such as for jet engine, and rocket nozzle applications. Those skilled in the art will readily appreciate the that the teachings of the present invention may be adapted for any such material without deviating from the scope of the invention, particularly regarding the general arrangement and operation of the inter-contacting nozzle vanes.

Figure 7:
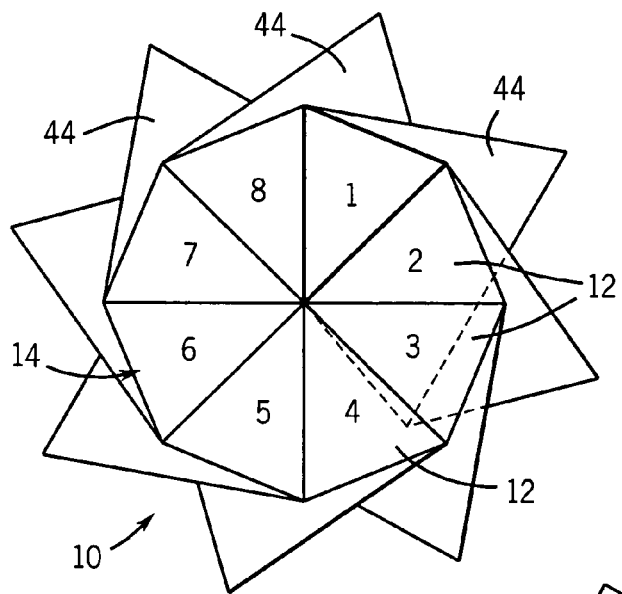
FIG. 7 is view of the front side the nozzle of FIG. 1 illustrating arrangement of the vanes when in the closed position.

FIG. 7 is an elevational view of the nozzle vanes of FIG. 1 in their closed position, with the front face 14 of the nozzle facing the viewer. As can be seen in this view, the vanes in this embodiment are generally triangular in cross-section, although various other cross-sections may be envisaged. Similarly, because the nozzle in this figure is radially symmetrical, the vanes are self-similar. Each of the vanes contacts one another along side surfaces and can slide along these side surfaces during opening and closing as discussed in greater detail below. As is also visible in FIG. 7, owing to the angle of incline of the vanes to form the generally conical nozzle, the vanes expand outwardly from the front face toward the rear face. Similarly, owing to the skew angle indicated in FIG. 1, the vanes are slightly twisted or rotated from their position at the front face to their position at the rear face (see FIGS. 8 and 9). This combination of incline and skew results in an overlap in the vanes that varies from the front face to the rear face.

Figure 8:
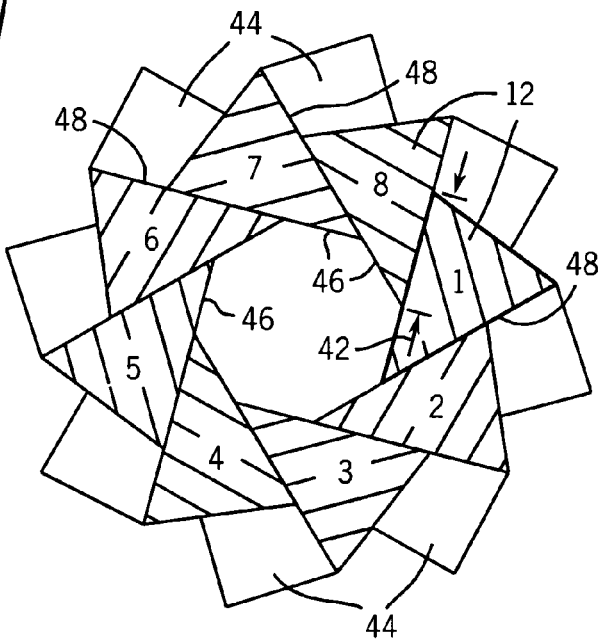
FIG. 8 is a sectional view along line 8-8 of FIG. 1 illustrating the slight skew of the vanes as they recede back from the smaller front end of the nozzle to the larger rear end.
Figure 9:
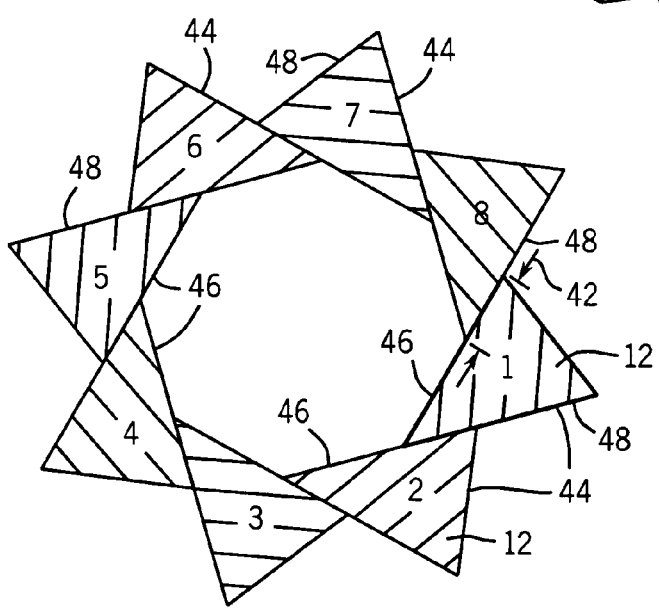
FIG. 9 is a further sectional view along line 9-9 of FIG. 1 showing arrangement of the vanes still further back towards the large or open end of the nozzle and further illustrating the skew of the vanes as they rise towards the rear end.

FIGS. 8 and 9 illustrate the same nozzle, in the same position, but sectioned between the front face and the rear face, with FIG. 8 being a section toward the front face, but removed from the front face, and FIG. 9 being sectioned somewhat further back along the nozzle. As shown in these figures, the cross-section 40 of the vane remains constant in the illustrated embodiment. The overlap between the vanes, indicated generally by reference numeral 42, however, becomes less moving from the front face to the rear face due both to the angle of incline of the vanes with respect to one other and to the skew angle. In general, the simplified embodiment of FIGS. 8 and 9 includes vanes having what may be termed an outer side of 44, a first contact side 46, and a second contact side 48. Owing to the skew of the vanes moving from the front face toward the rear face (the skew being generally in a clockwise direction in the embodiment illustrated), the degree of contact between the first contact side 46 of each vane and the second contact side 48 of the immediately adjacent vane is progressively reduced moving toward the rear of the nozzle, as illustrated best in FIGS. 8 and 9. Similarly, owing to the skew angle of the vanes in the assembly, each vane appears displaced radially outwardly in the assembly when viewed from the front face shown in FIG. 7 through the progressive sections of FIGS. 8 and 9. It should be noted that as the nozzle is opened, however, the angular orientations of the vanes does not change. Thus, the vanes will tend to move in a particular and unique way owing to the skew provided between the similar vanes in the assembly.

Figure 10:
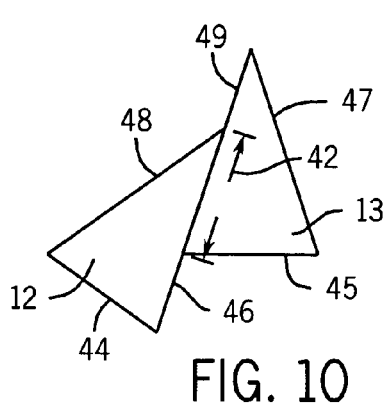
FIG. 10 is diagrammatical representation of two exemplary vanes of a nozzle of the type shown in preceding figures illustrating contacting sides of two adjacent vanes.
Figure 11:
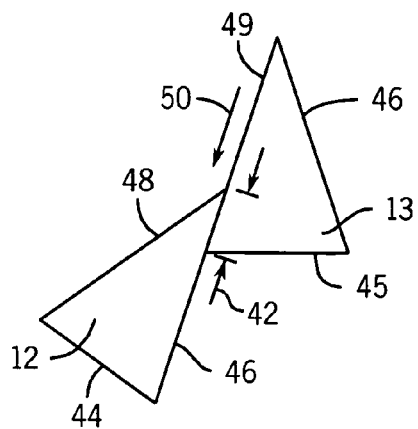
FIG. 11 is a view of the two vanes of FIG. 10 showing the type of sliding motion that the vanes undergo as the nozzle is opened and closed.

FIGS. 10 and 11 illustrate the movement of two adjacent vanes in a nozzle of the type shown in the previous figures. As illustrated in FIG. 10, adjacent vanes 12 and 13 contact one another at the first contact side 46 of vane 12 and second contact side 49 of vane 13. This contact generally forms a seal between the vanes that confines the inner volume of the nozzle. As the nozzle is opened and closed, then, sliding contact occurs between these contact sides as illustrated by arrow 50 in FIG. 11.

Figure 12:
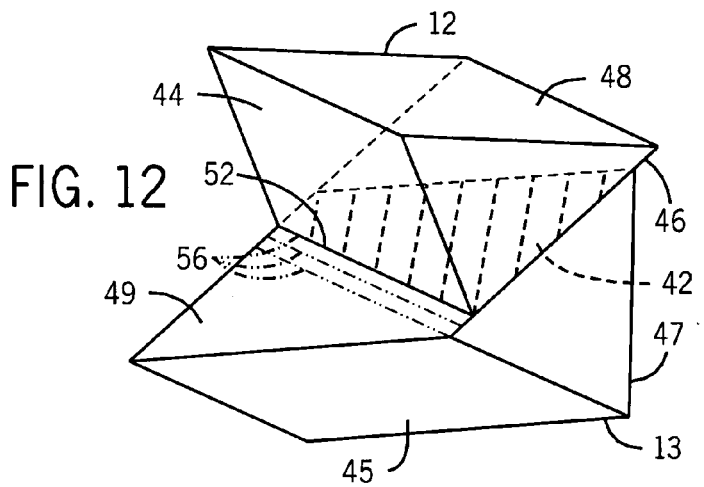
FIG. 12 is a perspective view of the two vanes of FIG. 11 illustrating overlap between the vanes as one moves from the front end of the nozzle toward the rear end.
Figure 13:
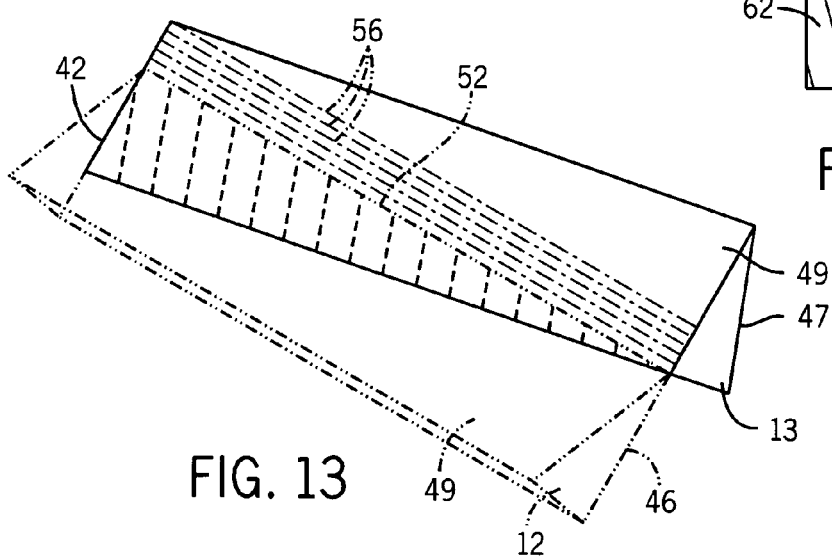
FIG. 13 is a view similar to that of FIG. 12, but showing lines representative of the edge of the overlap of the two vanes as they are moved during opening and closing of the nozzle.

As illustrated in FIGS. 12 and 13, adjacent vanes in the nozzle contact one another along lines of contact that are generally not parallel to the edges of the vanes, as defined by the outer edges of the vanes. That is, the limit of contact of the first contact side 46 each vane 12 traces a line of contact 52 along the second contact side 49 of an adjacent vane 13 which is not parallel to the edge of the vanes. In general, this geometry results from the skew angle of the vanes with respect with to one another. In a conical or convergent nozzle of the type shown in the preceding figures, this inclined angle of contact is also due to the angle of incline of the vanes with respect to one another. As the vanes are slid with respect to one another during opening and closing of the nozzle, then, moving lines of contact may be traced as generally indicated at reference numeral 56 in FIG. 13. The lines in FIG. 13 generally indicate the limits of contact between the vanes as traced along the edge of one vane overlapping with an adjacent vane.

Figure 14:
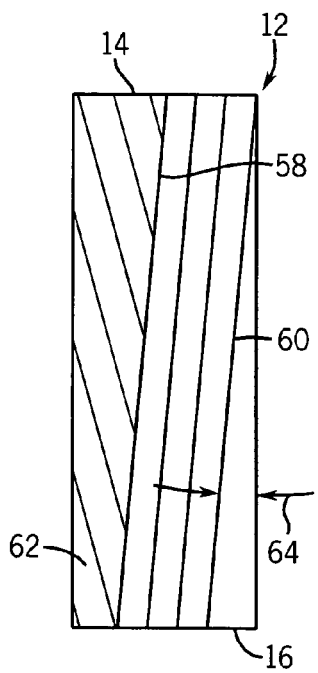
FIG. 14 is a plan view of one side of one of the vanes of the conical nozzle of the type illustrated in the previous figures illustrating the parallel lines of overlap between vanes as the vanes are moved during opening and closing of the nozzle.

These lines of contact and overlap are represented in greater detail in the plan view of FIG. 14. As shown in FIG. 14, each vane 12 in the illustrated embodiment, particularly in the simplified conical, convergent nozzle shown in the preceding figures, may have a generally rectangular contact face or side. The contact side is designed to abut against, seal with, and slide with respect to an adjacent contact side of an adjacent vane. As the vanes are moved with respect to one another, they stay in intimate contact along their full length and define generally parallel lines of contact limits as illustrated in FIG. 14. Four such lines are shown in FIG. 14 for four different stages of opening of a nozzle of the type shown in the preceding figures. The left-most line 58 shown in FIG. 14 traces an inclined path with respect to edges of the vane from a front face 14 to a rear face 16. The line terminates at the front corner of the vane due to the geometries of the vane and the assembly that permit the assembly to be fully closed. That is, the adjacent vane exactly contacts the front corner of the illustrated vane in the fully-closed position in a manner similar to a shutter. As the vanes are slid with respect to one another, parallel lines of contact are traced as illustrated in FIG. 14 until a line of fully opened overlap is reached as indicated at reference 60 in FIG. 14. The overlap or seal area between the vanes, as indicated at reference numeral 62, is located to the left of each of these lines. That is, at any stage of opening or closing, the adjacent vane will overlap the illustrated vane fully to the left of any one of the parallel lines illustrated. Again, the angle 64 of the lines with respect to the edge of the vanes results both from the angle of incline of the vanes in the conical arrangement illustrated, as well as from the skew angle of the vanes from the front face to the rear face. The area not covered by the overlap region 62 will generally be exposed along the outer periphery of the nozzle, as can be seen in FIGS. 1-6.

Figure 15:
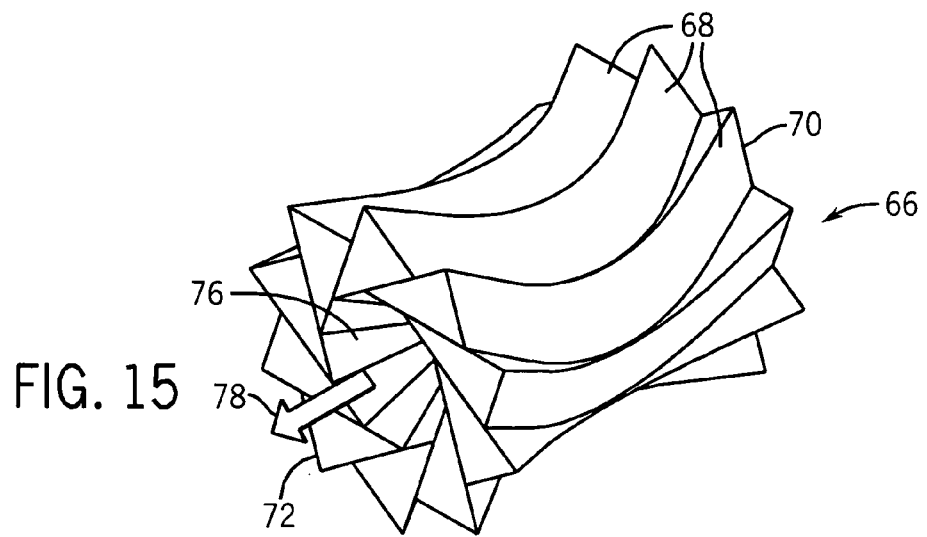
FIGS. 15-19 are illustrations of another exemplary nozzle configuration making use of parallel vanes, but in which the vanes are configured to provide a convergent-divergent nozzle geometry.
Figure 16:
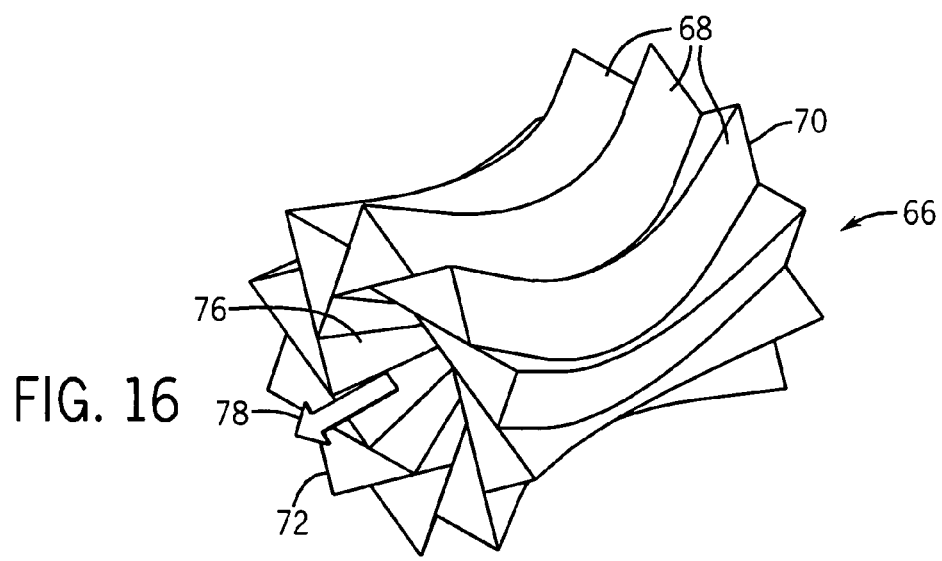
Figure 17:
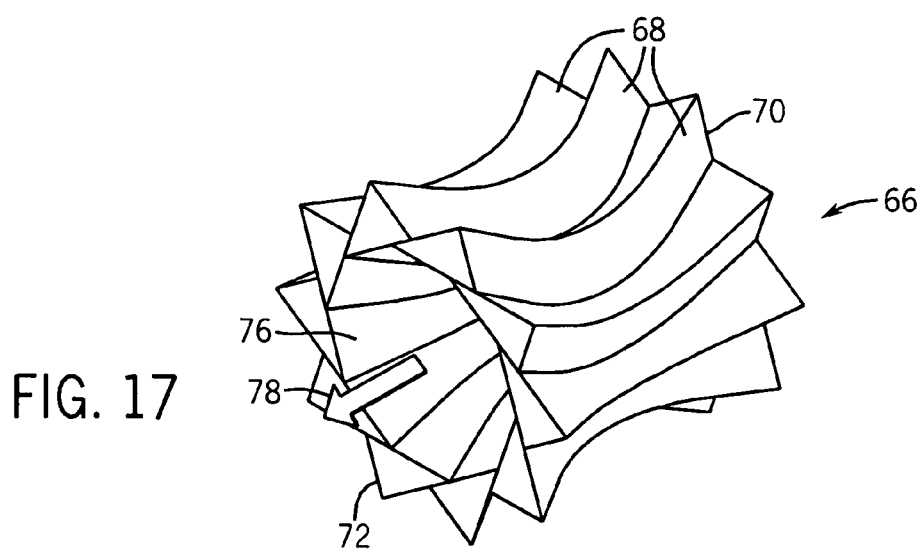
Figure 18:
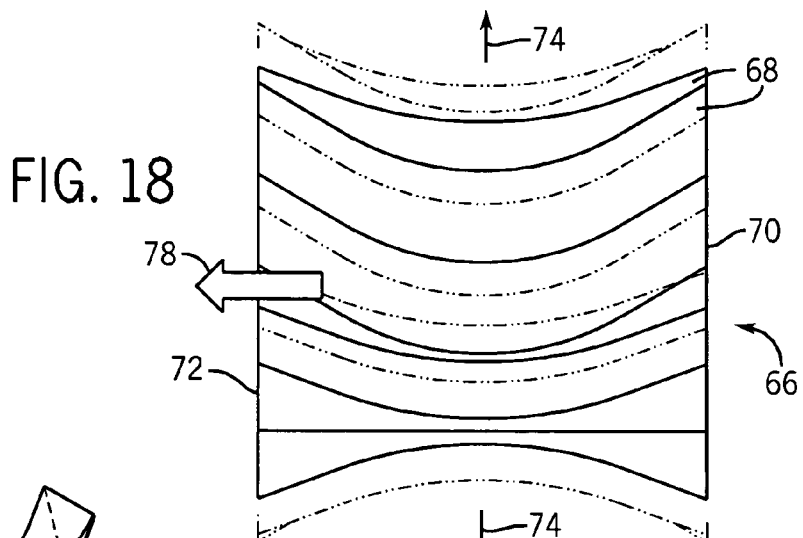
Figure 19:
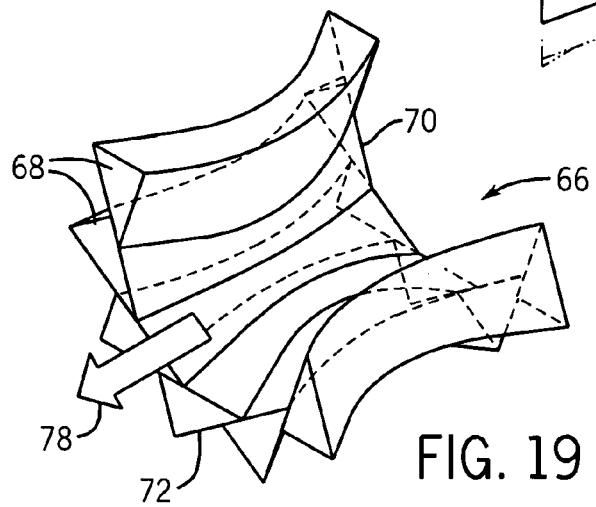

As noted above, the present invention may be used to configure nozzles of various geometries, generally formed by altering the configuration of the vanes, the number of vanes, and so forth. FIGS. 15-19 illustrate an exemplary convergent-divergent nozzle made up of a number of self-similar vanes arranged in a radially symmetrical assembly. As in the previous embodiments, the convergent-divergent nozzle 66 would be associated with one or more control elements, such as control rings that cause expansion and contraction of the nozzle by sliding motion of the vanes on one another as described above. These additional structures have been eliminated from the illustrations for the sake of simplicity. Similarly, the nozzle could be positioned within a housing or other support structure, and constrained at its forward end or rear end, or both. FIGS. 15, 16 and 17 show the convergent-divergent nozzle 66 as being made up of a plurality of vanes 68 which will have contact sides in a manner similar to that described above that slide on one another. An upstream end 70 of the nozzle forms an entry side of the structure, while a downstream end 72 forms the exit side. FIGS. 15, 16 and 17 illustrate stages in progressively opening the nozzle, providing a progressively larger opening 76. As the opening expands, a flow path 78 through the nozzle is defined and enlarged. FIG. 18 is a side elevational view of the same nozzle illustrating the movement through sliding contact of the vanes, as indicated generally by arrows 74 as the nozzle is opened. FIG. 19 is a perspective view in which some of the vanes have been removed to show the inner periphery of the nozzle that defines the flow path 78.

As will be appreciated by those skilled in the art, such nozzles may have carefully defined upstream, downstream, and transition sections so as to accelerate, decelerate and otherwise control the flow of fluids therethrough. The present invention allows for a wide range of specific configurations for such nozzles both in terms of their initial and final geometries during opening and closing, and for intermediate geometries defined by movement of the vanes with respect to one another. Moreover, the vanes can be configured to provide for complete or substantially complete closing of the nozzle at a location between the upstream end 70 and the downstream end 72.

As also noted above, nozzles in accordance with present inventions may be configured for shrouded applications, such as hydroelectric turbine injector assemblies. FIGS. 20-23 illustrate an exemplary nozzle for such applications. In the illustrated embodiment, the shrouded nozzle 80 is made up of a plurality of vanes 82 arranged in a generally conical configuration. Again, however, any suitable convergent, divergent or convergent-divergent arrangement may be made. The vanes generally have an upstream end 84 and downstream end 86 from which fluid exits. A shroud or containment housing 88 substantially surrounds the vanes to direct flow and to equalize pressure in the arrangement. As in the previous example, the vanes would be contacted by control structures, such as control rings, although such structures are not illustrated in FIGS. 20 and 23 for the sake of simplicity. Such structures, in high flow or high pressure applications may be powered in any suitable means, such as by hydraulic motors, hydraulic actuators, electric and mechanical actuators, and so forth.

In the embodiment illustrated, the shrouded nozzle 80 defines a flow path 90 through the vanes from the upstream end 84 to the downstream end 86. A feed tube 92 delivers fluid to the nozzle, the flow of which is regulated by opening and closing the nozzle by sliding contact of the vanes on one another as described above. It may be noted that in this embodiment the vanes have a non-triangular cross-section. In general, the invention is not limited to triangular vane cross-sections, but more complex cross-sections may be defined for the inter-engagement of the vanes with one another.

Figure 21:
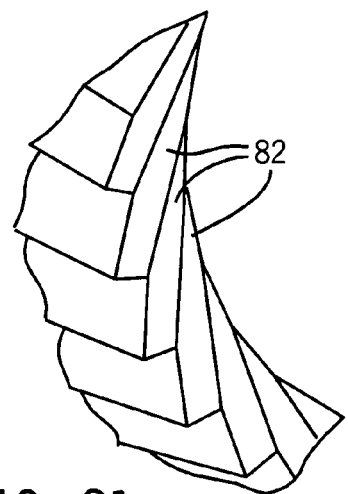
FIGS. 21 and 22 are detailed views of the vanes of the nozzle of FIG. 20 showing their movement from a more closed position to a more open position at the front edge of the nozzle.
Figure 22:
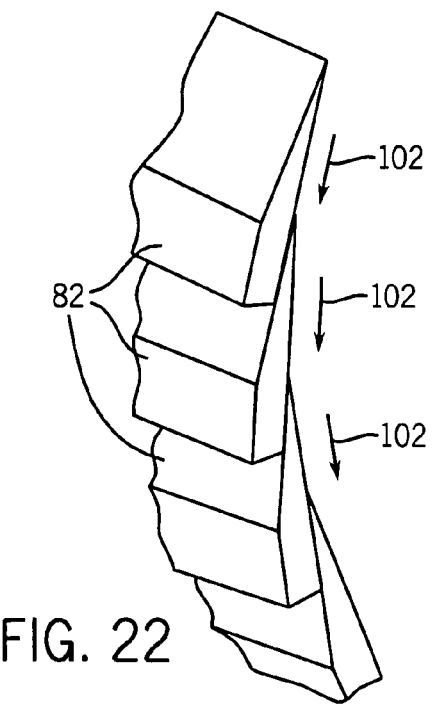
Figure 20:
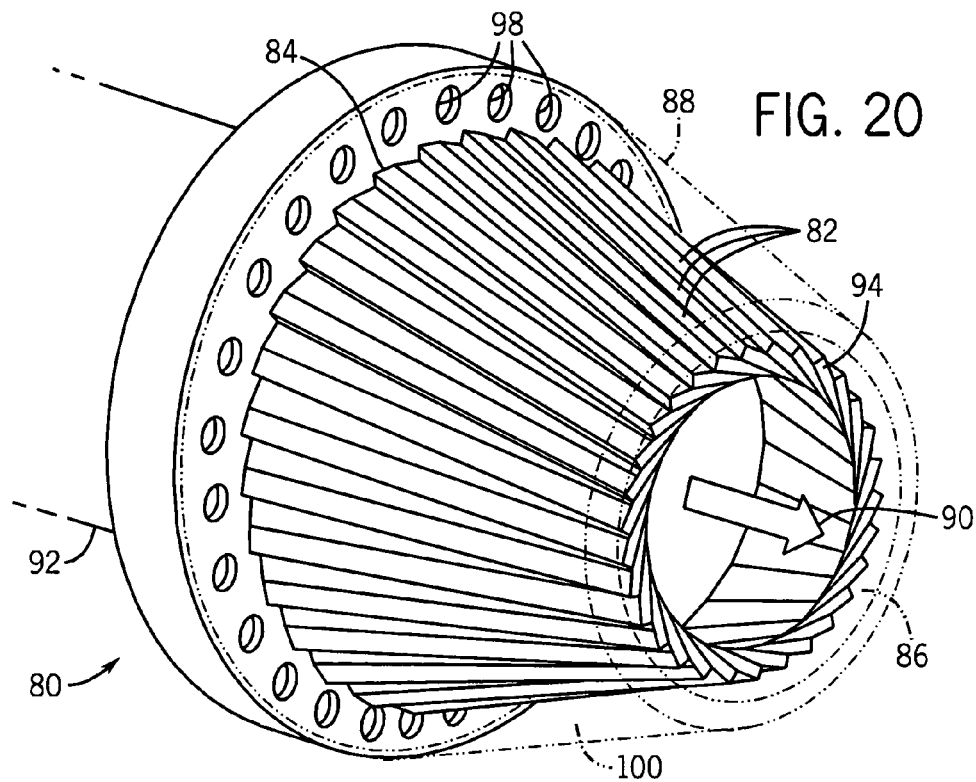
FIG. 20 is perspective view of a portion of a shrouded nozzle of the type that may be employed in fluid flow applications, such as a hydroelectric turbine injector.
Figure 23:
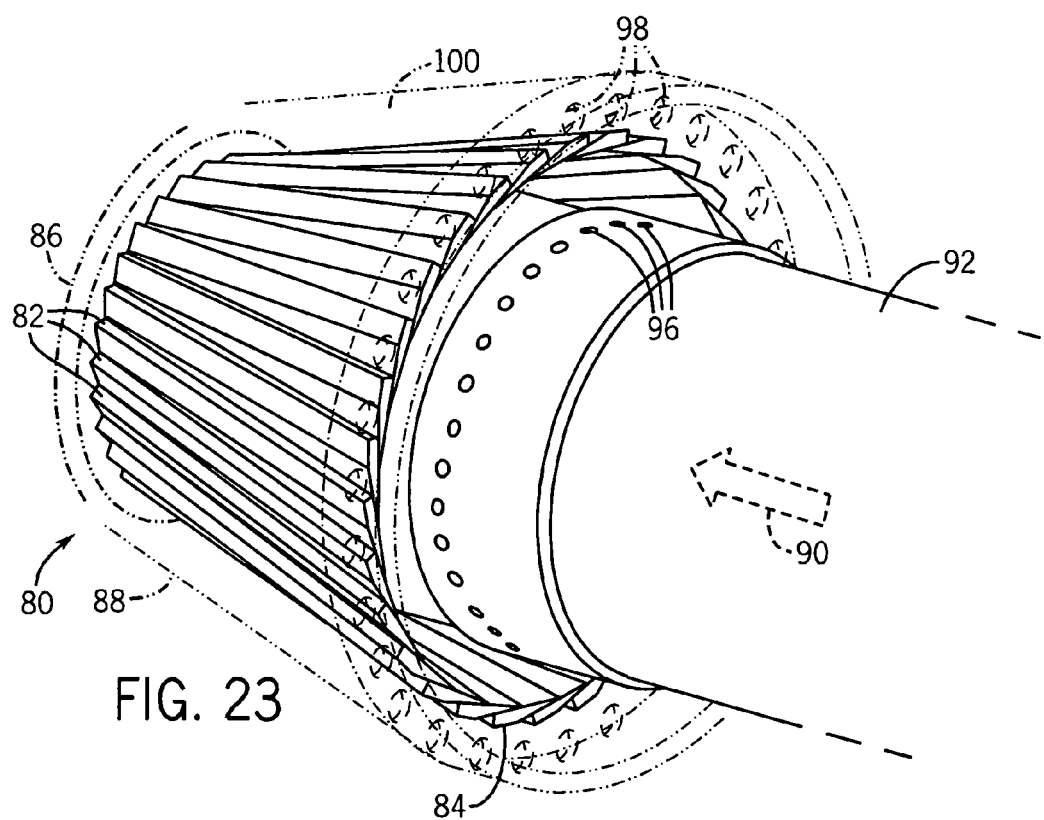
FIG. 23 is a rear perspective view of the nozzle of FIG. 20 illustrating one manner in which the nozzle and shroud may provide for pressure balancing on either side of the movable vanes.
Figure 28:
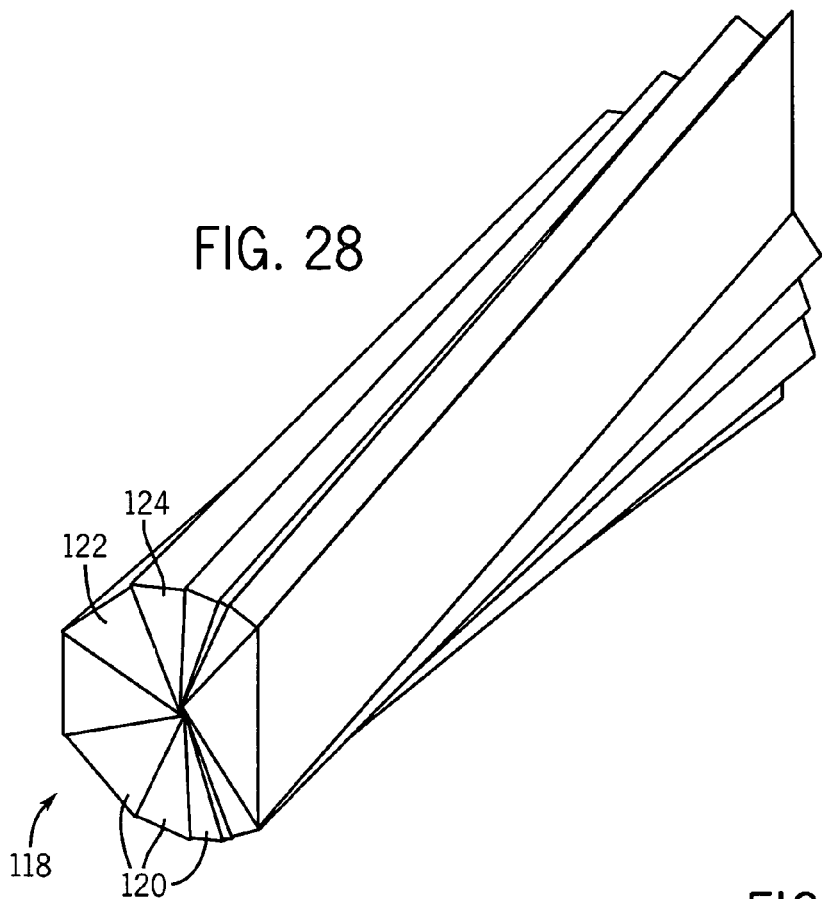

Moreover, in the embodiment contemplated in FIGS. 20-23, pressure equalization openings 96 and 98 are provided in both the feed tube 92 and the inner portion of the shroud 88. As will be appreciated by those skilled in the art, the function of the nozzle is essentially to direct pressurized fluid flow, with the pressure of the flow being relieved at the exit of the nozzle or partially converted to a velocity head. The pressure equalization openings 96 and 98 are intended to transmit static pressure from the fluid flowing through the feed tube 92 and the nozzle to an outside volume 100 defined between the vanes and the shroud. The high pressure within the nozzle, then, is at least partially equalized to facilitate structurally holding the vanes in place, and to allow for more easily opening and closing the nozzle by manipulation of the vanes. As in the previous embodiments, such opening and closing is performed by sliding motion of the vanes on one another as illustrated in FIGS. 21 and 22, and indicated by reference numerals 102.

As also noted above, a range of specific geometries for flow paths can be provided by the present invention by appropriately designing the vanes and the surfaces that guide their motion, particularly the cross-sections of the vanes, the angles defined by the vane cross-sections, the angle of skew, and so forth. FIGS. 24-27 illustrate one such nozzle which is non-radially symmetrical. The nozzle 104 illustrated in these figures defines a generally oblong opening that can be completely closed by sliding motion of the vanes as described above. Again, here the control structures, such as control rings have not been illustrated to allow the viewer to better see the vanes and their arrangement in the nozzle. The vanes 106 in the nozzle 104 are comprised of several different geometries. For example, vanes 108 have a different geometry than vanes 110. In the illustrated embodiment, three different geometry vanes are employed in a bilaterally symmetrical design, but one that is not radially symmetrical. As before, the vanes are inclined in the nozzle and skewed with respect to one another moving from a front face or side towards a rear face or side. FIGS. 24 and 26 illustrate a closed configuration 112 of the nozzle in which the vanes are slid toward one another by their contacting surfaces to completely close the nozzle. FIGS. 25 and 27 illustrate a partially opened configuration 114 of the nozzle in which an oblong opening 16 is formed in the front face for the exit of fluid.

Figure 29:
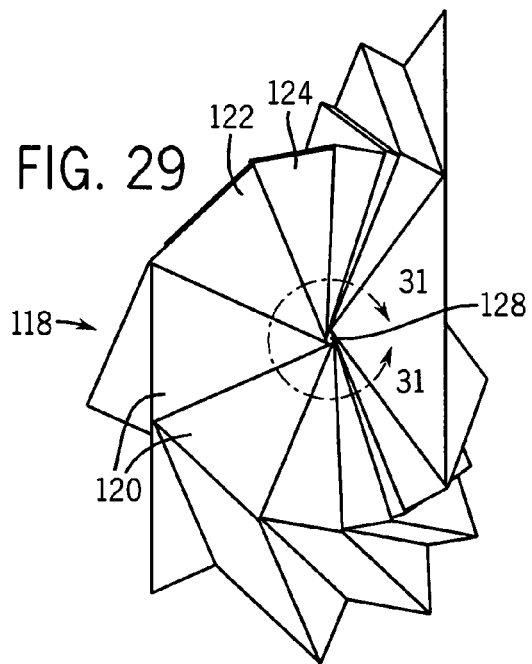
Figure 30:
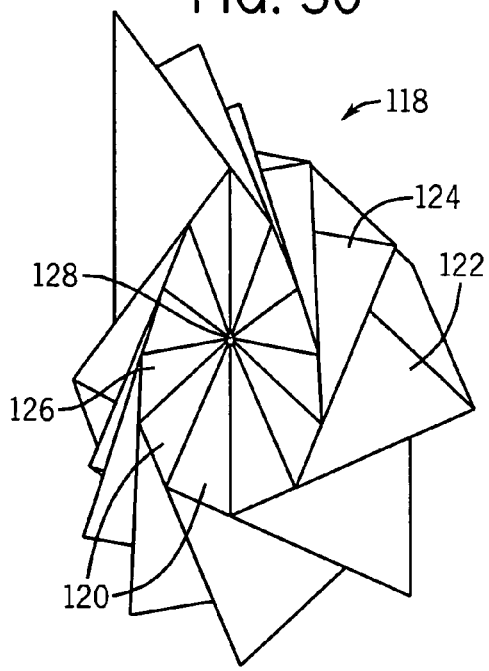
Figure 31:
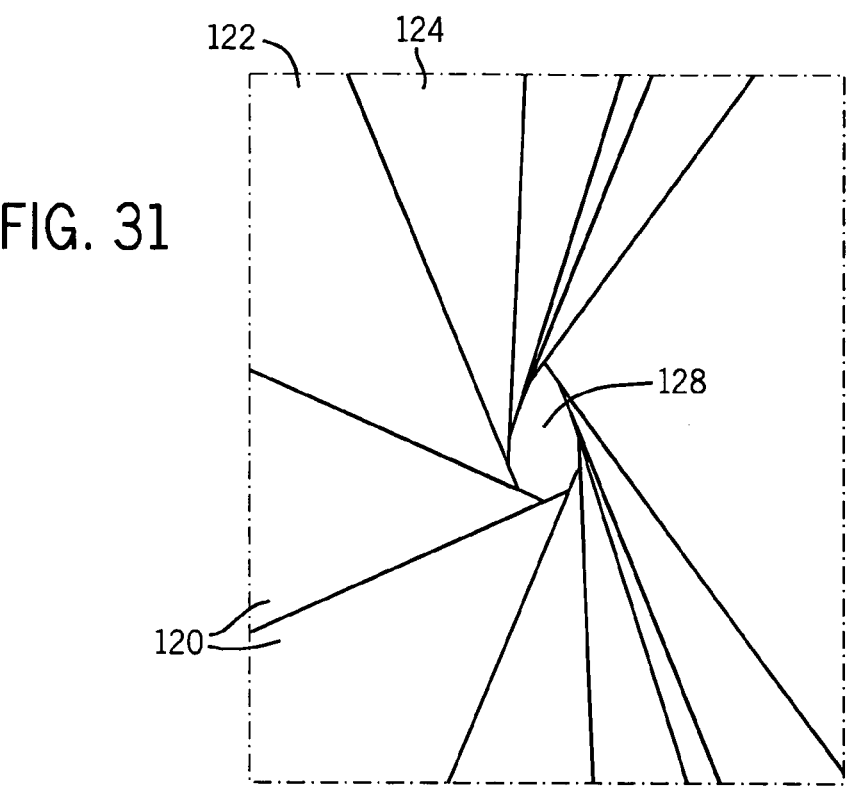
Figure 32:
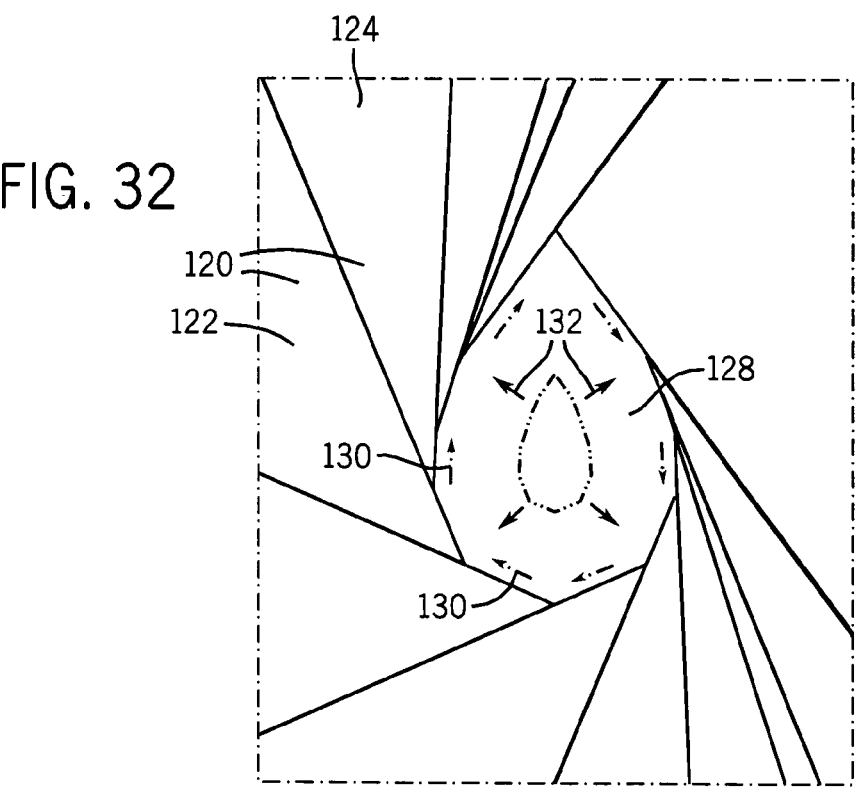

It should also be noted that a wide range of other opening configurations can be obtained by multi-vane skewed nozzles in accordance with the present invention. FIGS. 28-32 illustrate a further example of a non-radially symmetrical nozzle 118. Nozzle 118 is made up of a plurality of vanes 120, having different geometries as exemplified by reference numerals 122 and 124. In the specific example illustrated, vanes having seven different geometries are employed. From the perspective view of FIG. 28, it can be seen that the movement of the vanes on one another in the same manner as described above can be made to substantially close the nozzle by contact at a forward end. As shown in FIGS. 29 and 30, which are front and rear elevational views, respectively, sliding of the vanes with respect to one another, then, forms an opening 128 through which fluid can pass. A rear or internal volume 126 formed by the surrounding vanes leads to opening 128 as best illustrated in FIG. 30. The nozzle 118 provides a generally teardrop-shaped opening. FIGS. 31 and 32 illustrate in greater detail how the opening is defined by sliding contact of the skewed vanes with respect to one another. Ultimately, the opening is enlarged by such sliding contact as indicated by reference numeral 130 in FIG. 32, such that the same teardrop-shape is expanded as indicated by arrows 132.

In addition to the various configurations depicted in the figures and described above, it should be borne in mind that many shapes and flow paths may be defined in nozzles made by the present invention. For example, while certain nozzles having 8 or 16 vanes have been illustrated (in addition to other numbers), in practice the invention may include nozzles having as few as 3 vanes. Nozzles having 20 or many more vanes are also presently contemplated.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A variable geometry nozzle configured to regulate flow of a fluid, the nozzle comprising:
 a plurality of vanes disposed adjacent to and in contact with one another, each vane having first and second contact sides, the first contact side of each vane in sliding contact with the second contact side of an adjacent vane, the vanes defining a skew angle from a front side of the nozzle towards a rear side thereof, wherein the vanes are movable in sliding contact on one another along their entire length for altering the geometry of a flow path through the nozzle, and wherein the skew angle remains substantially constant when the nozzle is moved from a closed position to an opened position.

2. The nozzle of claim 1, wherein the vanes are self-similar.

3. The nozzle of claim 1, wherein the vanes are configured and disposed in the nozzle to form a convergent flow path.

4. The nozzle of claim 1, wherein sliding of the vanes defines parallel lines of overlap of respective first and second contact sides of adjacent vanes.

5. The nozzle of claim 4, wherein the overlap between the vanes provides a seal along the entire length of the nozzle.

6. The nozzle of claim 1, wherein the vanes are configured and disposed to permit complete closing of a flow path through the nozzle.

7. The nozzle of claim 1, comprising at least 8 vanes.

8. The nozzle of claim 1, further comprising at least one control element in contact with the vanes to force the vanes to slide with respect to one another to alter the geometry of the flow path through the nozzle.

9. The nozzle of claim 8, wherein the at least one control element includes an outer control ring.

10. The nozzle of claim 8, wherein the at least one control element includes an inner control ring.

11. A variable geometry nozzle configured to regulate flow of a fluid, the nozzle comprising:
a plurality of vanes disposed adjacent to and in contact with one another, each vane having first and second contact sides, the first contact side of each vane in sliding contact with the second contact side of an adjacent vane, the vanes defining a skew angle from a front side of the nozzle towards a rear side thereof, wherein the vanes are and movable in sliding contact on one another along their entire length for altering the geometry of a flow path through the nozzle, and wherein the skew angle remains substantially constant when the nozzle is moved from a closed position to an opened; and a control device configured to contact the vanes to urge sliding of the vanes to alter the geometry of the flow path.

12. The nozzle of claim 11, wherein the control device includes an outer control ring.

13. The nozzle of claim 12, wherein the control device includes an inner control ring.

14. The nozzle of claim 12, wherein the vanes are self-similar.

15. A variable geometry nozzle configured to regulate flow of a fluid, the nozzle comprising:
a plurality of vanes, each vane having a first contact side and a second contact side, the first contact side of each vane being in sliding contact with the second contact side of an adjacent vane, the vanes defining a skew angle with respect to an axis of the nozzle from a front side to a rear side thereof, the skew angle remaining substantially constant when the nozzle is moved from a closed position to an opened position, the vanes being movable by sliding contact of the respective contacting first and second sides along their entire length to alter the geometry of a flow path through the nozzle.

16. The nozzle of claim 15, wherein the vanes are self-similar.

17. The nozzle of claim 15, wherein the vanes are configured and disposed in the nozzle to form a convergent flow path.

18. The nozzle of claim 15, wherein the vanes are arranged to form a generally radially symmetrical cross section nozzle.

* * * * *